Feb. 17, 1970  P. D. C. MORRIS  3,495,314
METHOD OF SEALING A MEMBER IN AN OPENING IN A BODY
Filed May 3, 1967
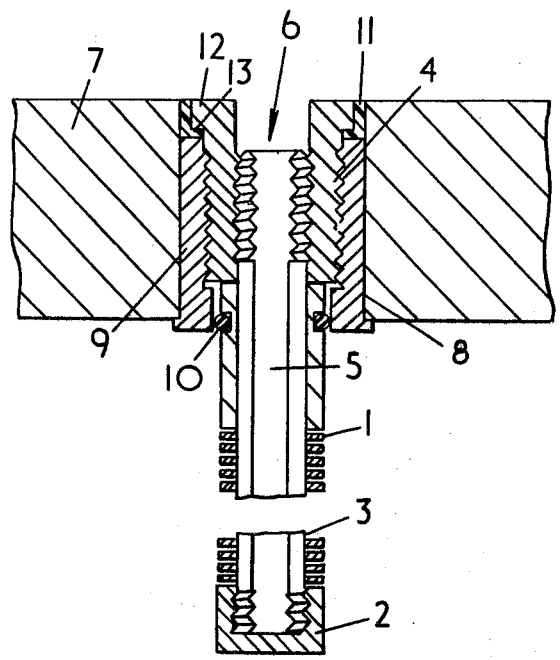

United States Patent Office 3,495,314
Patented Feb. 17, 1970

3,495,314
METHOD OF SEALING A MEMBER IN AN OPENING IN A BODY
Peter Douglas Campbell Morris, Kingsclere, near Newbury, England, assignor to Stella-Meta Filters Limited, near Whitchurch, Hampshire, England, a British company
Filed May 3, 1967, Ser. No. 635,775
Claims priority, application Great Britain, May 13, 1966, 21,374/66
Int. Cl. B23p *11/00*
U.S. Cl. 29—157          4 Claims

ABSTRACT OF THE DISCLOSURE

A seal is made between, for example, a circular bolt head and a close-fitting housing by a plastic sleeve which is cut on its inside face as the bolt head is forced home to be turned into a perfectly-mating cup washer.

---

This invention relates to arrangements for sealing an annular body portion in a cylindrical body portion. Specifically, the invention relates to arrangements for sealing two such portions together, where it is required to occupy a clearance between the two members so that this clearance cannot be penetrated by ambient liquid. The invention also relates to means being provided whereby an annular body portion may be sealed around a close-fitting cylindrical body portion whilst permitting the two portions to be removed from one another without difficulty at a later time.

Circumstances often arise in which two body portions, for example, two apparatus or machine parts, have to be fitted one into the other, where a clearance therebetween has to be sealed. Sometimes, this seal is required to prevent the transmission of fluid, and at other times it is required merely to prevent the establishment of a pocket of liquid in circumstances where bacterial decomposition may otherwise be initiated. One particular example is the case where the cylindrical head of a threaded member is received into a corresponding recess in another member when the two are screwed together. To establish a seal it is of course possible to have the head engage against a flat annular washer housed inside a counterbore in the other member, but this still leaves a cylindrical clearance.

The invention consists in a method of sealing a clearance between a cylindrical body member and an encircling annular body member which comprises fitting a sleeve of a ductile plastics material in the annular body member, and forcing the cylindrical body member into position with an interference fit between it and the sleeve so that a radially inner layer of the sleeve is cut away by the advancing cylindrical member and forced downwardly against a seat associated with the annular body member whilst at the same time the sleeve is pressed radially outwardly against the inner face of the annular body member in which it is fitted, thus converting the sleeve into an accurately fitting cup washer.

The invention has particular reference to the case where the cylindrical body member is the head of a screw threaded bolt and the annular body member and seating are defined by a counterbore in which the head is received. In this case, the bolt is initially sealed into position cutting its way through the sleeve and thus accurately dimensioning the remainder of the sleeve to occupy the space between the annular and cylindrical body members.

The expression "cylindrical body member" will be understood to mean a circular body or portion of a larger body whether solid or apertured. The expression "annular body member " will be understood to mean a body or part of a body having a cylindrical inner face in which the cylindrical body member will fit, and the expression "ductile plastics material" will be understood to mean a plastics material the surface layers of which can be cut away by an advancing square-edged body ploughing through the surface layers of the same to leave a smooth coherent surface behind and without the cut-away portion breaking up into chips or powder. Polytetrafluoroethylene has been found particularly suitable for this purpose, its low coefficient of friction with respect to metal permitting subsequent withdrawal of the annular body member when required.

The present method of providing a seal finds particular application in food machinery where pockets in which bacterial decomposition can become established are to be avoided. One specific application of the invention lies in the mounting of tubular edge filter assemblies in division plates for use in for example the filtering of beer. It has been customary to bore and thread a division plate by screwing them into threaded engagement within the corresponding bores. To avoid an undesired pocket at the top of the division plate, it has been customary to provide that the head of each edge filter disc assembly overlies the top of the division plate, the latter thus not being counterbored to receive the head. Even so, problems have arisen from the clearance between the disc assembly and the lower part of the bore, on the side of the division plate remote from the aforementioned head. In this particular application of the invention, it is preferred that the bore in the division plate should not itself be theraded but instead should be occupied by an annular insert which can be located by expanding it against the interior of the bore through the division plate. This insert is threaded and itself provides the equivalent of a counterbore on the upper side of the division plate by restricting the lower part of said bore. According to the invention, a sleeve of ductile plastics material such as polytetrafluoroethylene is inserted as a close fit in this counterbore and the edge filter disc assembly is screwed into position. According to a further feature of the invention, the edge filter disc assembly is furnished with a sealing ring, suitably an O-ring which may be of a conventional high polyacrylonitrile synthetic rubber, located to seal against the inner face of the insert just below a threaded portion thereof substantially level with where the assembly emerges below the insert. In this way, the formation of any pocket of liquid (such as beer) to be filtered is prevented both above and below the division plate.

The expression "interference fit" used herein should be understood as meaning that the external diameter of the annular body member exceeds the internal diameter of the sleeve of plastics material so that the latter is cut and/or plastically deformed to assume the form of an accurately fitting cup washer as the annular body member is forced home. In one example, the dimensions of the various parts are such that the wall and base of the resulting cup washer are each of the order of 1–4 mms. thick.

One embodiment of the invention is illustrated in the accompanying drawing, which is a longitudinal sectional view of a filter element mounted in a division plate of a sterile beer filter, only a fragment of the division plate being shown.

The filter element comprises a stack of edge filter discs 1 clamped between the head 2 of a bolt 3 and a cylindrical nut 4 into which the bolt screws. The bolt 3 is formed with longitudinal collecting channels 5 along which liquid which has penetrated radially inwardly between the discs 1 can drain to an outlet 6. The filter element is supported in a division plate 7, which may typically be a substantial steel plate formed with a considerable number of bores each accommodating the upper end of one filter element. In a typical example, the division plate may be perhaps 4 or 5 feet in diameter, about 2 inches thick and may carry over 100 filter elements.

In the drawing, only one such bore 8 is illustrated. This has a flanged sleeve 9 inserted from the underside, this sleeve being threaded to engage a corresponding thread on the exterior of the nut 4. Below the threaded part of the sleeve 9 the sleeve seals against the shank of the nut 4 by means of an O-ring 10 carried in a groove in the aforesaid shank (or alternatively in the flanged sleeve 9). Before the nut 4 is fitted the sleeve 9 is anchored securely in position by being expanded radially outwardly through the application of a suitable expanding tool to the inner bore of the sleeve at the lower end, below the threaded part.

Also, prior to the insertion of the nut 4, a cylindrical washer 11 of polytetrafluoroethylene is inserted as a close fit in the bore 8 to lodge against the upper end of the sleeve 9. The nut 4 has an enlarged head 12 which is an interference fit with the washer 11 so that, as the nut 4 is screwed home, the head 12 bites into the radially inner part of the washer 11, pares the surface layers away and collects these together under the head 12 in the form of a flat ring 13 integrally with the remainder of the sleeve 11 so that the polytetrafluoroethylene now assumes the form of a cup washer 11, 13. This cup washer is an extremely accurate fit with respect to the head 12 of the nut 4 and the surrounding bore 8 of the division plate 7 so that the nut 4 can be withdrawn to remove the filter element and then replaced. If however a different nut 4 is used, that is to say, if the filter element is not replaced in the same bore after removal for cleaning or other attention, then a fresh washer 11 should be employed.

Th use of the washer 11 and the O-ring 10 serves to isolate the space between the edge disc assembly and the sleeve 9 from the ingress of liquid undergoing filtration and thus removes one of the major sources of contamination in a sterile filter plant. The very accurate fit of the head of the edge filter disc assembly, that is to say, of the nut 4, into the washer 11 and the very accurate fit of this washer against the division plate 7 also serves to prevent the penetration of filtered sterile liquid into an area where it would otherwise be difficult to prevent the onset of contamination.

I claim:
1. A method of sealing a clearance between a cylindrical body member and an encircling annular body member which comprises fitting a sleeve of a ductile plastics material in the annular body member, and forcing the cylindrical body member into position with an interference fit between it and the sleeve so that a radially inner layer of the sleeve is cut away by the advancing cylindrical member and forced downwardly against a seat associated with the annular body member whilst at the same time the sleeve is pressed radially outwardly against the inner face of the annular body member in which it is fitted, thus converting the sleeve into an accurately fitting cup washer.

2. A method according to claim 1, wherein the cylindrical body member is in the form of a head on a screw which is screwed into a counterbore line with said sleeve of ductile plastics material.

3. A method according to claim 1, wherein said plastics material is polytetrafluoroethylene.

4. A method according to claim 1, applied to the mounting of a tubular filter body in a division plate, the head of said tubular filter body representing said cylindrical body member, the division plate being sealed to the filter tube at the side where the filter tube protrudes, by an O-ring.

References Cited

UNITED STATES PATENTS

| 339,133 | 4/1886 | Bogan | 210—233 |
| 2,062,186 | 11/1936 | Mittelman. | |
| 2,238,582 | 4/1941 | Dickinson et al. | 29—432 X |
| 2,514,976 | 7/1950 | Stivin. | |
| 2,819,099 | 1/1958 | Rittle | 285—159 |
| 3,114,969 | 12/1963 | Roth | 285—159 X |
| 3,185,268 | 5/1965 | Heine | 29—432 X |
| 3,309,549 | 3/1967 | Bluemink | 29—432 X |

CHARLIE T. MOON, Primary Examiner

U.S. Cl. X.R.

29—432, 450; 210—232; 277—212; 285—159